US012589824B2

(12) United States Patent
Wood

(10) Patent No.: US 12,589,824 B2
(45) Date of Patent: Mar. 31, 2026

(54) TRIKE TILTING AXLE ASSEMBLY

(71) Applicant: Jarrett Wood, Kotara South (AU)

(72) Inventor: Jarrett Wood, Kotara South (AU)

( * ) Notice: Subject to any disclaimer, the term of this patent is extended or adjusted under 35 U.S.C. 154(b) by 418 days.

(21) Appl. No.: 18/254,548

(22) PCT Filed: Dec. 3, 2021

(86) PCT No.: PCT/AU2021/051441
§ 371 (c)(1),
(2) Date: May 25, 2023

(87) PCT Pub. No.: WO2022/126175
PCT Pub. Date: Jun. 23, 2022

(65) Prior Publication Data
US 2024/0010292 A1 Jan. 11, 2024

(30) Foreign Application Priority Data
Dec. 17, 2020 (AU) ................................ 2020904702

(51) Int. Cl.
*B62K 5/08* (2006.01)
*B62K 5/02* (2013.01)
(Continued)

(52) U.S. Cl.
CPC .................. *B62K 5/08* (2013.01); *B62K 5/02* (2013.01); *B62K 5/10* (2013.01); *B62K 25/00* (2013.01)

(58) Field of Classification Search
CPC ............... B62K 5/08; B62K 5/10; B62K 5/02
See application file for complete search history.

(56) References Cited

U.S. PATENT DOCUMENTS

| | | | | |
|---|---|---|---|---|
| 2,045,028 | A | * | 6/1936 | Sellman ................... B60G 9/00 |
| | | | | 267/257 |
| 6,039,335 | A | * | 3/2000 | Sheridan .............. B62D 21/183 |
| | | | | 280/124.106 |

(Continued)

FOREIGN PATENT DOCUMENTS

| | | | | |
|---|---|---|---|---|
| EP | 3251931 A1 | * | 12/2017 | ............... B62K 5/06 |
| EP | 3290315 A1 | * | 3/2018 | ............... B62K 7/04 |

(Continued)

OTHER PUBLICATIONS

International Search Report & Written Opinion dated Mar. 9, 2022 from PCT Application No. PCT/AU2021/051441.

*Primary Examiner* — Valentin Neacsu
*Assistant Examiner* — Hosam Shabara
(74) *Attorney, Agent, or Firm* — INNOVATION CAPITAL LAW GROUP, LLP; Vic Lin

(57) ABSTRACT

A trike tilting axle assembly has a steering post turning an upper axle assembly. A lower axle assembly is coupled beneath the upper axle assembly by cross linkages which create a virtual pivot point for the upper axle assembly and the steering post. Tilting linkage assemblies are pivotally coupled at lower ends thereof from opposite sides of the lower axle assembly and engage respective wheel axles at upper end thereof, each of which holds a respective wheel. Control arms connect the upper axle assembly to respective upper ends of the tilting linkage assemblies. As the assembly tilts and the upper axle assembly moves sideways with respect to the lower axle assembly, the control arms push or pull the respective tilting linkage assemblies such that the wheels lean over in the same direction as the steering post whilst the assembly mimics the geometry and feel of an existing bicycle.

13 Claims, 3 Drawing Sheets

(51) Int. Cl.
    *B62K 5/10*          (2013.01)
    *B62K 25/00*       (2006.01)

(56)                 References Cited

U.S. PATENT DOCUMENTS

| | | | |
|---|---|---|---|
| 10,076,939 B2 * | 9/2018 | Simon ................. | B60G 21/055 |
| 2009/0008890 A1 * | 1/2009 | Woodford ............... | B60G 3/20 |
| | | | 280/124.113 |

FOREIGN PATENT DOCUMENTS

| | | | |
|---|---|---|---|
| JP | S5026545 U | 3/1975 | |
| WO | 1999047372 A1 | 9/1999 | |
| WO | WO-0107275 A1 * | 2/2001 | ......... B60G 17/0152 |

\* cited by examiner

TRIKE TILTING AXLE ASSEMBLY

FIELD OF THE INVENTION

This invention relates generally to tilting axle assembly for a trike or other similar two-wheeled arrangements.

SUMMARY OF THE DISCLOSURE

There is provided herein a trike tilting axle assembly which may be integrally manufactured as part of a trike or the like or retrofitted to an existing bicycle frame.

The assembly comprises a steering post turning an upper axle assembly. A lower axle assembly is coupled beneath the upper axle assembly by cross linkages which create a virtual pivot point for the upper axle assembly and the steering post.

Tilting linkage assemblies are pivotally coupled at lower ends thereof from opposite sides of the lower axle assembly and engage respective wheel axles at upper end thereof, each of which holds a respective wheel.

Control arms connect the upper axle assembly to respective upper ends of the tilting linkage assemblies. As the assembly tilts and the upper axle assembly moves sideways with respect to the lower axle assembly, the control arms push or pull the respective tilting linkage assemblies such that the wheels lean over in the same direction as the steering post whilst the assembly mimics the geometry and feel of an existing bicycle.

The upper axle assembly may extend forward from a lower end of the steering post to define a load platform thereatop.

Furthermore, pivot points connecting the cross linkages to the upper axle assembly may be further apart than pivot points connecting the cross linkages to the lower axle assembly. As such, as the assembly tilts, the load rises, thereby biasing the assembly to a neutral centre position.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
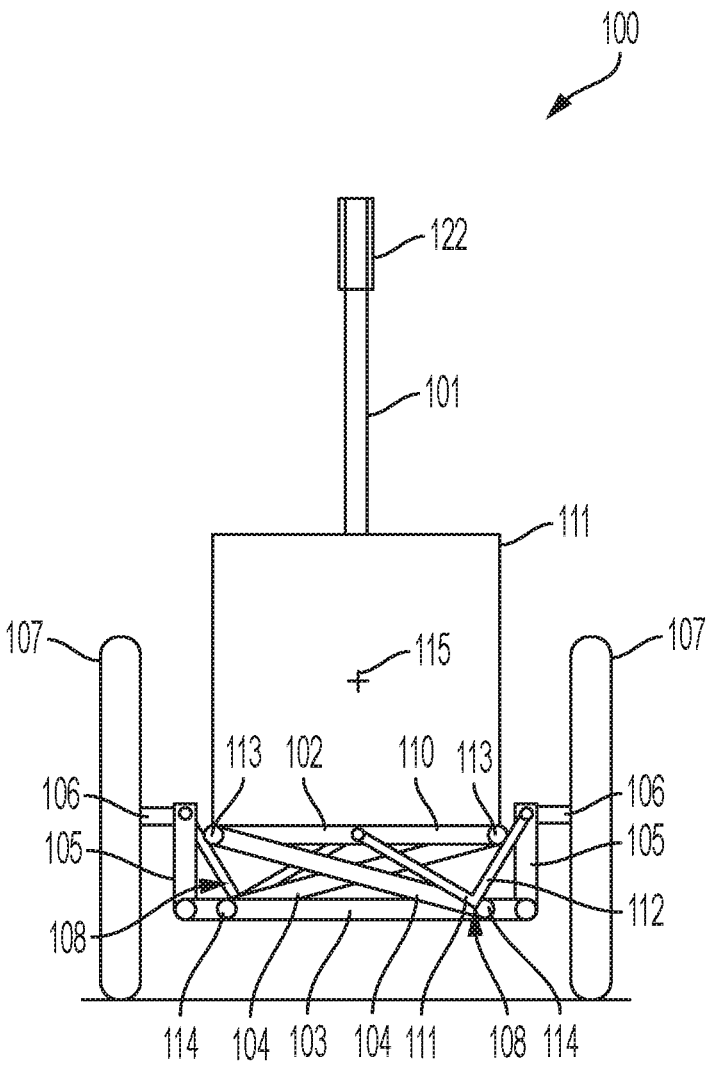
FIG. 1 shows a front elevation view of a trike tilting axle assembly in a neutral centre position in accordance with an embodiment.

A trike tilting axle assembly 100 comprises a steering post 101 turning an upper axle assembly 102 from a lower end thereof. The assembly 100 further comprises a lower axle assembly 103 coupled beneath the upper axle assembly 102 by cross linkages 104.

The cross linkages 104 create a virtual pivot point about which the upper axle assembly 102 and steering post 101 pivot.

Figure 3:
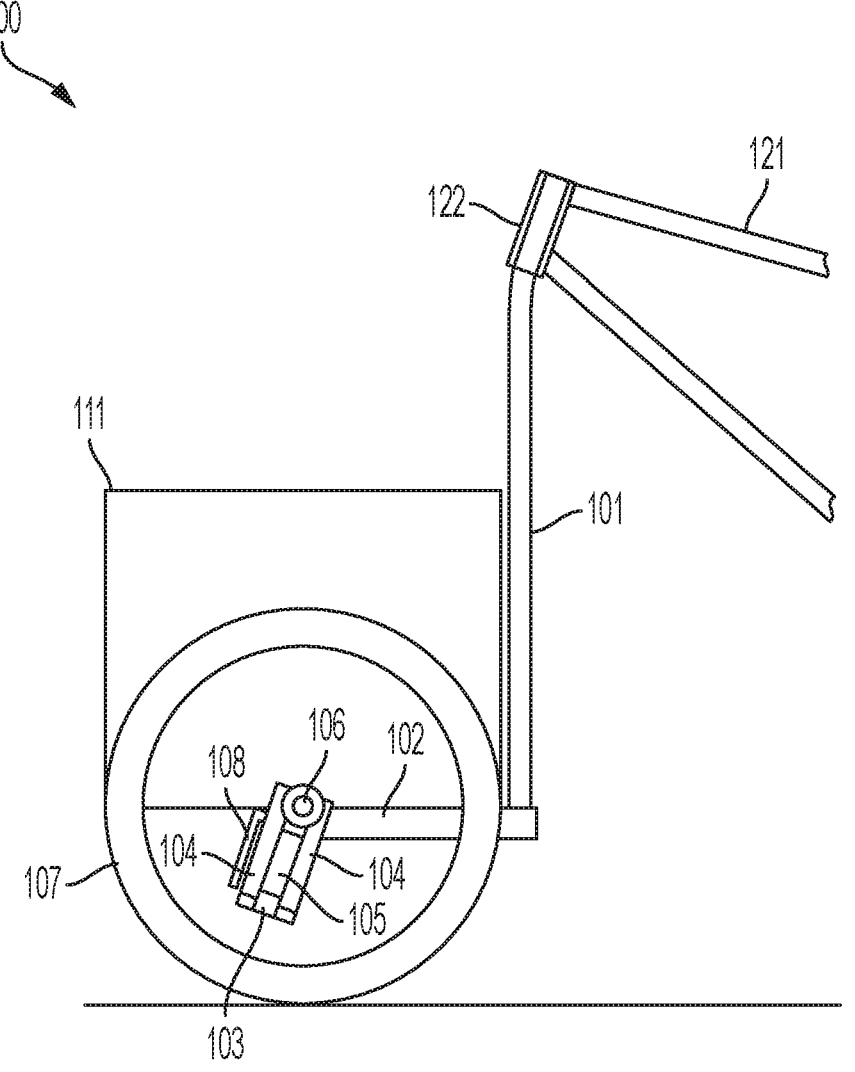
FIG. 3 shows a side elevation view of the assembly.

As is shown in FIG. 3, the assembly 100 may be attached to a front of a bicycle frame 121 to provide a trike assembly having two wheels 107 at the front and a single wheel at the back. The assembly 100 may be retrofitted to an existing bicycle frame 121 by inserting and engaging an upper portion of the steering post 101 within the steering tube 122 of the bicycle frame 121. Alternatively, a tricycle may be manufactured in the first instance comprising the tilting axle assembly 100.

The assembly 100 further comprises tilting linkage assemblies 105 pivotally coupled at lower ends thereof from opposite sides of the lower axle assembly 103 and which engage wheel axles 106 at upper ends thereof, each wheel axle 106 engaging a respective wheel 107.

The assembly 100 further comprises control arms 108 connecting the upper axle assembly 102 to respective upper ends of the tilting linkage assemblies 105.

Each control arm 108 may be pivotally coupled at either end thereof between the upper axle assembly 102 and a respective tilting linkage 105. As is shown in FIG. 1, the control arms 108 may connect to a midpoint of the upper axle assembly 102.

FIG. 1 shows the assembly 100 in a neutral centre position wherein the steering post 101 is substantially vertical, wherein the upper and lower axle assemblies 102, 103 are horizontal and parallel and wherein the wheels 107 are upright.

Figure 2:
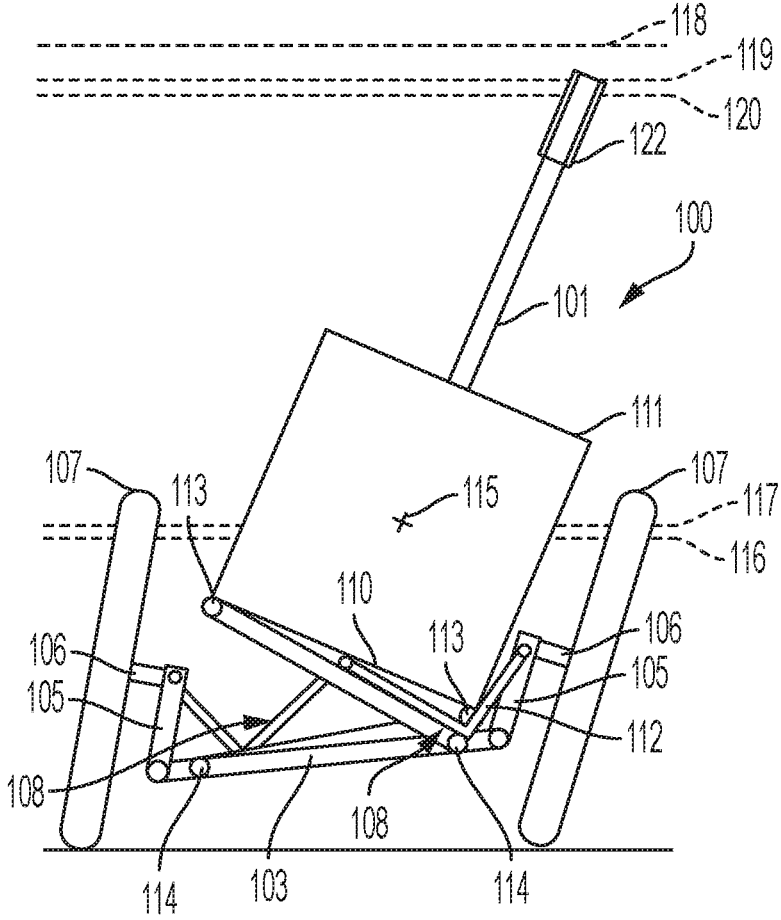
FIG. 2 shows the assembly of FIG. 1 when tilted.

FIG. 2 shows wherein the assembly 100 is tilted wherein the steering post 101 is at an angle to the ground, wherein the upper and lower axle assemblies 102, 103 are nonparallel and the wheels 107 lean over to the same side as the steering post 101.

As can be seen from FIG. 2, as the upper axle assembly 102 moves sideways with respect to the lower axle assembly 103, the control arms 108 push or pull the respective tilting linkage assemblies 105 over to thereby cause the wheels 107 to lean over in the same direction as the steering post 101.

As is shown in FIG. 3, the upper axle assembly 102 may extend forwardly from a lower end of the steering post 101 and an upper end of the steering post 101 may bend rearwardly. As such, the upper axle assembly 102 may define a load platform 110 thereatop for carrying loads 111. As is further shown in FIG. 3, the axles 106 may coincide substantially in elevation with the platform 110.

As is further shown in FIG. 3, the tilting linkage assemblies 105 may angle rearwardly from lower ends thereof with respect to the median plane shown in FIG. 3.

However, in an embodiment, the cross linkages 104 and tilting linkage assemblies 105 are perpendicular to the ground with respect to the median plane shown in FIG. 3 so as to reduce or eliminate effect on steering.

Each control arm 108 may transition downwardly between either end thereof to provide clearance around the platform 110. In the embodiment shown, each control arm 108 comprises a downward transitioning portion 111 and an upwardly extending portion 112. In the manner illustrated in FIG. 2, when the assembly 100 is tilted, the upwardly extending portion 112 may avoid an adjacent side of the platform 110. As is further shown, the upwardly extending portion 112 may be substantially orthogonal with the downwardly extending portion 111.

As is shown in FIG. 1, pivot points 113 connecting the cross linkages 104 to the upper axle assembly 102 may be further apart than pivot points 114 connecting the cross linkages 104 to the lower axle assembly 103. This particular arrangement raises the load 111 as the assembly 100 tilts, thereby biasing the assembly 100 to the neutral position shown in FIG. 1.

Specifically, as is illustrated in FIG. 2, and with reference to an imaginary midpoint 115 of the load 111, imaginary line 116 shows the height of the midpoint 115 when the assembly 100 is in the neutral centre position shown in FIG. 1 and imaginary line 117 shows the height of midpoint 115 when the assembly 100 is tilted in the manner shown in FIG. 2. As can be seen, the midpoint 115 is higher when the assembly 100 is tilted as is illustrated by imaginary line 117 being above imaginary line 116.

As is further illustrated in FIG. 2, imaginary line 118 represents the height of the top of the steering post 101 when the assembly 100 is in the neutral position shown in FIG. 1 and imaginary line 119 shows the height of the top of the steering post 101 when the assembly 100 is tilted in the manner illustrated in FIG. 2. Imaginary line 120 represents what would have been the top of the steering post 101 if the steering post 101 was turning about a single pivot point.

In embodiments, a tensioning member (such as a tensioned spring) is applied between the midpoint of the upper axle assembly 102 and the lower axle assembly 103 to pull the upper axle assembly 102 and the lower axle assembly 103 together to bias the assembly 100 to the neutral centre position shown in FIG. 1. This tension spring prevent one of the wheels 107 dropping substantially with respect to the other when the sensor 100 is lifted from the ground.

In embodiments, the assembly 100 may be usable rather for rear wheels of a trike. Yet further, the assembly 100 may be employed for two wheeled trailers, thereby allowing for dynamic stability and better tracking over uneven ground.

In embodiments, the upper axle assembly 102 may be defined by attaching the cross linkages 104 directly to lower ends of a bicycle steering fork.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A trike tilting axle assembly comprising a steering post turning an upper axle assembly, a lower axle assembly coupled beneath the upper axle assembly by cross linkages, tilting linkage assemblies pivotally coupled at lower ends thereof from opposite sides of the lower axle assembly and engaging wheel axles at upper ends thereof and control arms connecting the upper axle assembly to respective upper ends of the tilting linkage assemblies, wherein pivot points connecting the cross linkages to the upper axle assembly are further apart than pivot points connecting the cross linkages to the lower axle assembly.

2. The assembly as claimed in claim 1, wherein, a midpoint of the upper axle assembly is higher when the assembly is tilted.

3. The assembly as claimed in claim 1, wherein each control arm connects at a midpoint of the upper axle assembly.

4. The assembly as claimed in claim 1, wherein each control arm transitions downwardly between either end thereof.

5. The assembly as claimed in claim 4, wherein each control arm comprises a downward transitioning portion and an upper transitioning portion and wherein, when the upper axle assembly is tilted, the upper transitioning portion is out beyond a side of the upper axle assembly.

6. The assembly as claimed in claim 5, wherein the downward transitioning portion is orthogonal with the upper transitioning portion.

7. The assembly as claimed in claim 1, wherein the upper axle assembly extends forward from a lower end of the steering post towards the axles.

8. The assembly as claimed in claim 7, wherein the upper axle assembly defines a planar load platform thereatop.

9. The assembly as claimed in claim 8, wherein the axles are substantially at the same height as the platform.

10. The assembly as claimed in claim 7, wherein an upper end of the steering post bends rearwardly.

11. The assembly as claimed in claim 1, wherein the tilting linkage assemblies are angled rearwardly from lower ends thereof.

12. The assembly as claimed in claim 1, wherein the cross linkages and tilting linkage assemblies are perpendicular to the ground.

13. The assembly as claimed in claim 1, wherein a tensioning member between the upper axle assembly and the lower axle assembly pulls the upper axle assembly and the lower axle assembly together.

* * * * *